US012777143B2

(12) United States Patent
Wang et al.

(10) Patent No.: US 12,777,143 B2
(45) Date of Patent: Oct. 27, 2026

(54) METHOD FOR VIDEO ENCODING, METHOD FOR VIDEO DECODING, AND APPARATUS FOR VIDEO DECODING

(71) Applicant: GUANGDONG OPPO MOBILE TELECOMMUNICATIONS CORP., LTD., Dongguan (CN)

(72) Inventors: Fan Wang, Dongguan (CN); Zhihuang Xie, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 18/762,611

(22) Filed: Jul. 2, 2024

(65) Prior Publication Data

US 2024/0357088 A1 Oct. 24, 2024

Related U.S. Application Data

(63) Continuation of application No. PCT/CN2022/070403, filed on Jan. 5, 2022.

(51) Int. Cl.

*H04N 19/105* (2014.01)
*H04N 19/137* (2014.01)
*H04N 19/176* (2014.01)

(52) U.S. Cl.

CPC ......... *H04N 19/105* (2014.11); *H04N 19/137* (2014.11); *H04N 19/176* (2014.11)

(58) Field of Classification Search

None

See application file for complete search history.

(56) References Cited

U.S. PATENT DOCUMENTS

2017/0289566 A1* 10/2017 He ....................... H04N 19/147
2021/0152816 A1 5/2021 Zhang et al.

FOREIGN PATENT DOCUMENTS

CN 107040786 8/2017
CN 110213590 9/2019

(Continued)

OTHER PUBLICATIONS

WIPO, International Search Report for International Application No. PCT/CN2022/070403, May 25, 2022.

(Continued)

*Primary Examiner* — Christopher G Findley
(74) *Attorney, Agent, or Firm* — Hodgson Russ LLP

(57) ABSTRACT

A method for video encoding is provided. The method includes: determining spatial motion information and temporal motion information of a current block by performing spatial motion information prediction and temporal motion information prediction on the current block; adding the spatial motion information and the temporal motion information to a candidate motion information list of the current block in a set order; selecting one or more candidate motion information from the candidate motion information list, and recording an index of the selected candidate motion information; and determining a prediction block for the current block according to the selected candidate motion information, encoding the current block based on the prediction block, and encoding the index of the candidate motion information. Whether first temporal motion information is available is determined, and the first temporal motion information is not added to the candidate motion information list when the first temporal motion information is unavailable.

20 Claims, 7 Drawing Sheets

(56) References Cited

FOREIGN PATENT DOCUMENTS

| | | |
|---|---|---|
| CN | 110582002 | 12/2019 |
| CN | 113826397 | 12/2021 |

OTHER PUBLICATIONS

EPO, Extended European Search Report for EP Application No. 22917761.3, Oct. 17, 2025.

* cited by examiner

METHOD FOR VIDEO ENCODING, METHOD FOR VIDEO DECODING, AND APPARATUS FOR VIDEO DECODING

CROSS REFERENCE TO RELATED APPLICATION(S)

This application is a continuation of International Application No. PCT/CN2022/070403, filed Jan. 5, 2022, the entire disclosure of which is incorporated herein by reference.

TECHNICAL FIELD

This disclosure relates to, but is not limited to, video technologies, and in particularly to a method for video encoding, a method for video decoding, and an apparatus for video decoding.

BACKGROUND

At present, a block-based hybrid coding framework is adopted by all common video coding standards. Each picture, sub-picture, or frame in a video is divided into square largest coding units (LCUs) or coding tree units (CTUs) of a same size (such as 128×128, 64×64, etc.). Each LCU or CTU can be divided into rectangular coding units (CUs) according to rules. The CU may further be divided into prediction units (PUs), transform units (TUs), etc. The hybrid coding framework includes modules such as prediction, transform, quantization, entropy coding, in-loop filter, etc. The prediction module includes intra prediction and inter prediction. The inter prediction includes motion estimation and motion compensation. Since there is a strong correlation between adjacent samples in a video picture, intra prediction is used in the video coding technology to eliminate spatial redundancy between adjacent samples. Since there is a strong similarity between adjacent pictures in the video, inter prediction is used in the video coding technology to eliminate temporal redundancy between adjacent pictures, thereby improving coding efficiency.

However, the coding efficiency of existing inter prediction methods still needs to be improved.

SUMMARY

In a first aspect, a method for video encoding is provided. The method includes the following. A method for video encoding includes the following. Spatial motion information and temporal motion information of a current block are determined by performing spatial motion information prediction and temporal motion information prediction on the current block. The spatial motion information and the temporal motion information are added to a candidate motion information list of the current block in a set order. Whether first temporal motion information is available is determined in the temporal motion information prediction by: determining a first position in a current picture, wherein the first position is used for the temporal motion information prediction for the current block; determining, according to the first position, a collocated block in a collocated picture, and obtaining motion information of the collocated block; and determining, according to the motion information of the collocated block, whether the first temporal motion information of the current block obtained based on the first position is available. The first temporal motion information is not added to the candidate motion information list when the first temporal motion information is unavailable. One or more candidate motion information is selected from the candidate motion information list, and an index of the selected candidate motion information is recorded. A prediction block for the current block is determined according to the selected candidate motion information, the current block is encoded based on the prediction block, and the index of the candidate motion information is encoded.

In a second aspect, a method for video decoding is provided. The method includes the following. Spatial motion information and temporal motion information of a current block are determined by performing spatial motion information prediction and temporal motion information prediction on the current block. The spatial motion information and the temporal motion information are added to a candidate motion information list of the current block in a set order. Whether first temporal motion information is available is determined in the temporal motion information prediction by: determining a first position in a current picture, wherein the first position is used for the temporal motion information prediction for the current block; determining, according to the first position, a collocated block in a collocated picture, and obtaining motion information of the collocated block; and determining, according to the motion information of the collocated block, whether the first temporal motion information of the current block obtained based on the first position is available. The first temporal motion information is not added to the candidate motion information list when the first temporal motion information is unavailable. One or more candidate motion information is selected from the candidate motion information list according to an index of the candidate motion information of the current block obtained by decoding. A prediction block for the current block is determined according to the selected candidate motion information, and the current block is reconstructed according to the prediction block.

In a third aspect, an apparatus for video decoding is provided. The apparatus for video decoding includes a memory configured to: determine spatial motion information and temporal motion information of a current block by performing spatial motion information prediction and temporal motion information prediction on the current block, add the spatial motion information and the temporal motion information to a candidate motion information list of the current block in a set order, where whether first temporal motion information is available is determined in the temporal motion information prediction by: determining a first position in a current picture, wherein the first position is used for the temporal motion information prediction for the current block, determining, according to the first position, a collocated block in a collocated picture, and obtaining motion information of the collocated block, and determining, according to the motion information of the collocated block, whether the first temporal motion information of the current block obtained based on the first position is available, and the first temporal motion information is not added to the candidate motion information list when the first temporal motion information is unavailable, select one or more candidate motion information from the candidate motion information list according to an index of the candidate motion information of the current block obtained by decoding, and determine a prediction block for the current block according to the selected candidate motion information, and reconstruct the current block according to the prediction block.

BRIEF DESCRIPTION OF THE DRAWINGS

The accompanying drawings are used for facilitating the understanding of embodiments of the present disclosure, constitute a part of the specification, and are used for explaining technical solutions of the present disclosure together with embodiments of the present disclosure, but do not constitute a limitation on the technical solutions of the present disclosure.

DETAILED DESCRIPTION

Figure 1A:
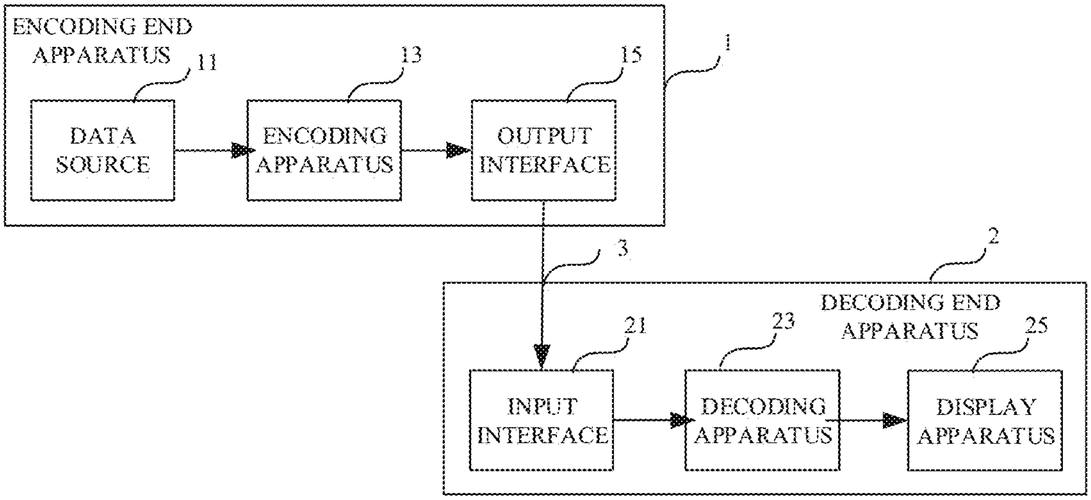
FIG. 1A is a schematic diagram of a system for coding according to an embodiment of the present disclosure.

Multiple embodiments are described in this disclosure, but such elaboration is intended for illustration rather than limitation. It will be apparent to those of ordinary skill in the art that, there can be other embodiments and implementations within the protection scope of the embodiments described in the disclosure.

In the elaborations of the disclosure, terms such as "exemplary" or "for example" are used to indicate an example, an illustration, or an explanation. Any embodiment described as "exemplary" or "for example" in the disclosure shall not be construed as preferable or advantageous over other embodiments. The term "and/or" in the disclosure describes an association between associated objects, and indicates that there may be three relationships. For example, A and/or B may mean A alone, both A and B exist, and B alone. "A plurality of" or "multiple" means two or more than two. In addition, in order to describe clearly technical solutions of the embodiments of the disclosure, terms such as "first" and "second" are used to distinguish the same items or similar items having substantially the same functions and effects. Those skilled in the art can understand that terms such as "first" and "second" do not limit the quantity and the execution order, and do not mean that there must be a difference between items.

When describing exemplary embodiments, the methods and/or procedures may be presented as a particular sequence of steps in the specification. However, if the method or procedure does not depend on the particular order of steps described herein, the method or procedure shall not be limited to the particular order of steps described. It can be understood by those of ordinary skill in the art that other sequences of steps are also possible. Thus, the particular order of steps described in the specification shall not be construed as a limitation on the claims. In addition, the claims regarding the methods and/or procedures shall not be limited to implementing the steps in the described order. It can be understood by those of ordinary skill in the art that these orders can be changed without departing from the spirit and scope of embodiments of the disclosure.

In the present disclosure, a video picture is abbreviated as a picture, and the picture includes a video picture and a partial region in the video picture. The partial region in the video picture may be, for example, a sub-picture, a slice, a slice segment, etc., divided from the video picture.

In the present disclosure, motion information derived through motion information prediction indicating a prediction operation includes reference picture information and motion vector (MV) information. In related video standards, "motion vector predictor" indicates the same prediction operation, so the "motion vector predictor" may also be understood as the motion information prediction. That is, motion information prediction in the disclosure can also be referred to as "motion vector predictor", or "motion information predictor".

In the present disclosure, "motion information" is used to refer to the result obtained through motion information prediction (motion vector predictor, or motion information predictor). For example, temporal motion information is obtained through temporal motion information prediction, and spatial motion information is obtained through spatial motion information prediction.

"Motion information" in the present disclosure is referred to as "motion vector prediction" in some standards. "Temporal motion information" in the present disclosure is sometimes referred to as "temporal motion vector prediction" in some standards. "Spatial motion information" in the present disclosure is sometimes referred to as "spatial motion vector prediction" in some standards.

In the present disclosure, a non-adjacent position of a current block refers to a position whose coordinates are not adjacent to any samples in the current block. An adjacent position of the current block refers to a position whose coordinates are adjacent to at least one sample in the current block.

In the present disclosure, the current block may be a current coding unit (CU), or a current prediction unit (PU), etc. A current picture refers to a picture where the current block is located, and a current picture sequence refers to a picture sequence where the current block is located.

FIG. 1A is a block diagram of a system for video coding applicable to embodiments of the present disclosure. As illustrated in FIG. 1A, the system includes an encoding end apparatus 1 and a decoding end apparatus 2. The encoding end apparatus 1 is configured to generate a bitstream. The decoding end apparatus 2 is configured to decode the bitstream. The encoding end apparatus 1 and the decoding end apparatus 2 each may include one or more processors and a memory coupled to the one or more processors. For example, the memory is a random access memory (RAM), an electrically erasable programmable read-only memory (EEPROM), a flash memory, or other media. The encoding end apparatus 1 and the decoding end apparatus 2 may be implemented with various apparatuses, such as a desktop computer, a mobile computing apparatus, a laptop computer, a tablet computer, a set-top box, a television, a camera, a display apparatus, a digital media player, a vehicle-mounted computer, or other similar apparatuses.

The decoding end apparatus 2 can receive the bitstream from the encoding end apparatus 1 via a link 3. The link 3 includes one or more media or apparatuses capable of transmitting the bitstream from the encoding end apparatus 1 to the decoding end apparatus 2. In an example, the link 3 includes one or more communication media that enable the encoding end apparatus 1 to transmit the bitstream directly to the decoding end apparatus 2. The encoding end apparatus 1 may modulate the bitstream according to communication standards (such as a wireless communication protocol) and may transmit the modulated bitstream to the decoding end apparatus 2. The one or more communication media may include wireless and/or wired communication media, such as a radio frequency (RF) spectrum or one or more physical transmission lines. The one or more communication media may form a part of a packet-based network, such as a local area network (LAN), a wide area network (WAN), or a global network (such as the Internet). The one or more communication media may include routers, switches, base stations, or other devices that facilitate communication from the encoding end apparatus 1 to the decoding end apparatus 2. In another example, the bitstream may also be output from an output interface 15 to a storage apparatus, and the decoding end apparatus 2 may read stored data from the storage apparatus via streaming or downloading.

In the example illustrated in FIG. 1A, the encoding end apparatus 1 includes a data source 11, an encoding apparatus 13, and an output interface 15. In some examples, the data source 11 may include a video capture apparatus (e.g., a camera), an archive containing previously captured data, a feeding interface for receiving data from a content provider, a computer graphics system for generating data, or a combination thereof. The encoding apparatus 13 can encode data from the data source 11 and output the encoded data to the output interface 15. The output interface 15 may include at least one of a regulator, a modem, or a transmitter.

In the example illustrated in FIG. 1A, the decoding end apparatus 2 includes an input interface 21, a decoding apparatus 23, and a display apparatus 25. In some examples, the input interface 21 includes at least one of a receiver or a modem. The input interface 21 may receive the bitstream via the link 3 or from the storage apparatus. The decoding apparatus 23 decodes the received bitstream. The display apparatus 25 is configured to display the decoded data, and the display apparatus 25 may be integrated with other apparatuses of the decoding end apparatus 2 or set separately. The display apparatus 25 may be, for example, a liquid crystal display (LCD), a plasma display, an organic light emitting diode (OLED) display, or a display apparatus of another type. In other examples, the decoding end apparatus 2 may not include the display apparatus 25, or may include other apparatuses or devices to which the decoded data is applicable.

Based on the system for video coding as illustrated in FIG. 1A, various methods for video coding may be used for video compression. The international video coding standards include H.264/advanced video coding (AVC), H.265/high efficiency video coding (HEVC), H.266/versatile video coding (VVC), a moving picture experts group (MPEG), an alliance for open media (AOM), an audio video coding standard (AVS), and extensions thereof, any other customized standards, and the like. In these standards, video compression technology is used to reduce the amount of data transmitted and the amount of data stored, thereby improving the efficiency of video coding, transmission, and storage. A block-based hybrid coding method is used in all the video coding standards mentioned above. Embodiments of the present disclosure are applicable to a basic process of a video codec under the block-based hybrid coding framework, but are not limited to the framework and the process.

Figure 1B:
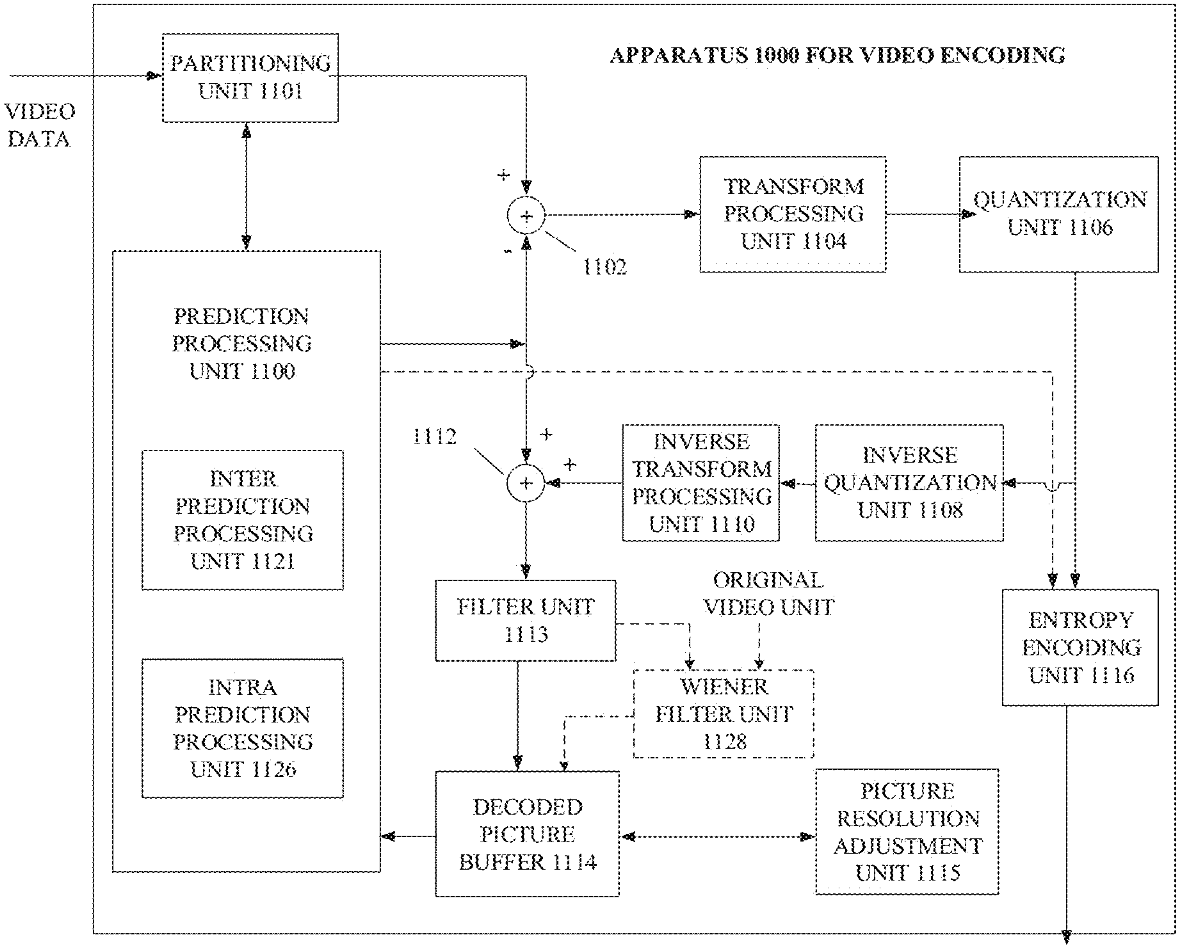
FIG. 1B is a structural diagram of an apparatus for video encoding according to an embodiment of the present disclosure.

FIG. 1B is a block diagram of an exemplary apparatus for video encoding applicable to embodiments of the present disclosure.

As illustrated in FIG. 1B, the apparatus 1000 for video encoding includes a prediction processing unit 1100, a partitioning unit 1101, a residual generation unit 1102, a transform processing unit 1104, a quantization unit 1106, an inverse quantization unit 1108, an inverse transform processing unit 1110, a reconstruction unit 1112, a filter unit 1113, a decoded picture buffer 1114, a picture resolution adjustment unit 1115, and an entropy encoding unit 1116. The prediction processing unit 1100 includes an inter prediction processing unit 1121 and an intra prediction processing unit 1126. The apparatus 1000 for video encoding may also include more, fewer, or different functional components than those illustrated in this example.

The partitioning unit 1101 is configured to partition, in cooperation with the prediction processing unit 1100, received video data into slices, CTUs, or other larger units. The video data received by the partitioning unit 1101 may be a video sequence of video frames such as an I-frame, a P-frame, or a B-frame.

The prediction processing unit 1100 may divide a CTU into CUs, and perform intra prediction coding or inter prediction coding on the CU. When the intra prediction and the inter prediction are performed on the CU, the CU may be partitioned into one or more PUs.

The inter prediction processing unit 1121 may perform inter prediction on a PU to generate prediction data for the PU, where the prediction data includes a prediction block for the PU, motion information of the PU, and various syntax elements.

The intra-prediction processing unit 1126 may perform intra prediction on a PU to generate prediction data for the PU, where the prediction data for the PU may include a prediction block for the PU and various syntax elements.

The residual generation unit 1102 may generate a residual block for a CU by subtracting a prediction block for a PU obtained by partitioning the CU from an original block for the CU.

The transform processing unit 1104 may partition a CU into one or more transform units (TUs). A TU-associated residual block is a sub-block obtained by partitioning a residual block for a CU. A TU-associated coefficient block is generated by performing one or more transforms on the TU-associated residual block.

The quantization unit 1106 may quantize coefficients in a coefficient block based on a selected quantization parameter (QP), and may adjust a degree of quantization for the coefficient block by adjusting a QP value.

The inverse quantization unit 1108 may perform inverse quantization on the coefficient block, and the inverse transform unit 1110 may perform inverse transform on the coefficient block, so as to obtain a TU-associated reconstructed residual block.

The reconstruction unit 1112 may add the reconstructed residual block to the prediction block generated by the prediction processing unit 1100, so as to generate a reconstructed block for a CU.

The filter unit 1113 performs in-loop filtering on the reconstructed block, and buffers the reconstructed block subject to in-loop filtering in the decoded picture buffer 1114 as a reference picture. The intra-prediction processing unit 1126 may extract a reference picture for blocks adjacent to a PU from the decoded picture buffer 1114 to perform intra prediction. The inter prediction processing unit 1121 may perform inter prediction on a PU in a current picture by using a reference picture for a previous picture buffered in the decoded picture buffer 1114.

The picture resolution adjustment unit 1115 resamples reference pictures buffered in the decoded picture buffer 1114, which may include upsampling and/or downsampling, so as to obtain reference pictures with various resolutions and buffer the reference pictures in the decoded picture buffer 1114.

The entropy encoding unit 1116 may perform entropy coding on received data, such as a syntax element, a quantized coefficient block, motion information, and the like.

Figure 1C:
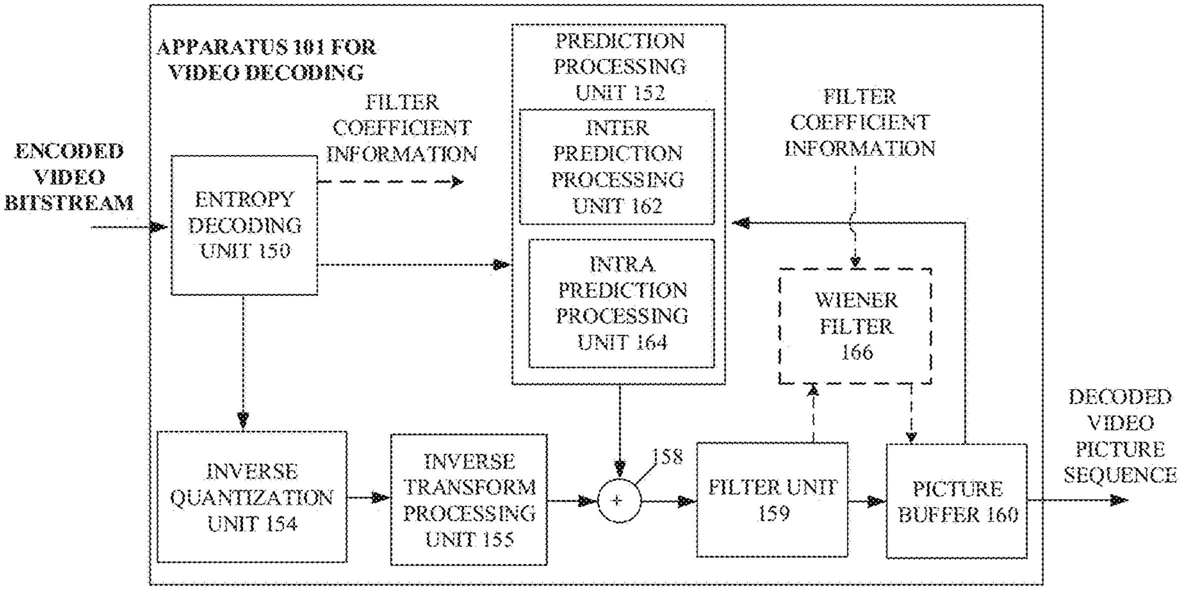
FIG. 1C is a structural diagram of an apparatus for video decoding according to an embodiment of the present disclosure.

FIG. 1C is a block diagram of an exemplary apparatus for video decoding applicable to embodiments of the present disclosure.

As illustrated in FIG. 1C, the apparatus 101 for video decoding includes an entropy decoding unit 150, a prediction processing unit 152, an inverse quantization unit 154, an inverse transform processing unit 155, a reconstruction unit 158 (denoted by a circle with a plus sign in the figure), a filter unit 159, and a picture buffer 160. In other embodiments, the apparatus 101 for video decoding may include more, fewer, or different functional components.

The entropy decoding unit 150 may perform entropy decoding on a received bitstream, and extract information such as a syntax element, a quantized coefficient block, and motion information of a PU. The prediction processing unit 152, the inverse quantization unit 154, the inverse transform processing unit 155, the reconstruction unit 158, and the filter unit 159 may perform their respective operations based on the syntax element extracted from the bitstream.

As a functional component for performing reconstruction, the inverse quantization unit 154 may perform inverse quantization on a quantized TU-associated coefficient block, and the inverse transform processing unit 155 may perform one or more inverse transforms on the inverse quantized coefficient block so as to generate a reconstructed residual block for a TU.

The prediction processing unit 152 includes an inter prediction processing unit 162 and an intra prediction processing unit 164. If a PU is encoded by intra coding, the intra prediction processing unit 164 may determine an intra prediction mode for the PU based on the syntax element parsed from the bitstream, perform intra prediction according to the determined intra prediction mode and reconstructed reference information adjacent to the PU obtained from the picture buffer 160, and generate a prediction block for the PU. If the PU is encoded by inter coding, the inter prediction processing unit 162 may determine one or more reference blocks for the PU according to motion information of the PU and a corresponding syntax element, and generate a prediction block for the PU based on the reference blocks.

The reconstruction unit 158 may obtain a reconstructed block for a CU based on a TU-associated reconstructed residual block and the prediction block (namely, intra prediction data or inter prediction data) for the PU generated by the prediction processing unit 152.

The filter unit 159 may perform in-loop filtering on the reconstructed block for the CU, so as to obtain a reconstructed picture, where the reconstructed picture is stored in the picture buffer 160. The picture buffer 160 may provide reference pictures for subsequent motion compensation, intra prediction, inter prediction, etc., or may output reconstructed video data as decoded video data for presentation on a display apparatus.

The display apparatus 25 described above may be, for example, an LCD, a plasma display, an OLED display, or other types of display apparatuses. In other examples, the decoding end may not include the display apparatus 25, but include other apparatuses to which the decoded data is applicable.

A basic process of video coding is as follows. At an encoding end, a picture (or frame) is partitioned into blocks. A prediction block for a current block is generated by performing intra prediction or inter prediction on the current block. A residual block is obtained by subtracting the prediction block from an original block of the current block. A quantization coefficient matrix is obtained by performing transform and quantization on the residual block. The quantization coefficient matrix is encoded into a bitstream by entropy encoding. At a decoding end, the prediction block for the current block is generated by performing intra prediction or inter prediction on the current block. On the other hand, the quantization coefficient matrix is obtained by parsing the bitstream, the residual block is obtained by performing inverse quantization and inverse transformation on the quantization coefficient matrix, and the reconstructed block is obtained by adding the prediction block and the residual block. The reconstructed blocks form a reconstructed picture. A decoded picture is obtained by performing loop filtering on the reconstructed picture on a picture basis or on a block basis. Similar operations for obtaining the decoded picture are also required at the encoding end. The decoded picture may be a reference picture of a subsequent picture for inter prediction. Block partition information determined at the encoding end, as well as mode information or parameter information for prediction, transformation, quantization, entropy coding, loop filtering, etc., are carried in the bitstream when necessary. The decoding end parses the bitstream and analyzes existing information to determine the block partition information, as well as the mode information or the parameter information for prediction, transformation, quantization, entropy coding, loop filtering, etc. the same as such information at the encoding end, so as to ensure that the decoded picture obtained by the encoding end is the same as the decoded picture obtained by the decoding end. The decoded picture obtained by the encoding end is also referred to as reconstructed picture. The current block can be partitioned into PUs during prediction. The above is the basic process of the video codec under the block-based hybrid coding framework. With the development of technology, some modules or steps of the framework or process may be optimized.

Motion and Motion Information

A video consists of pictures. In order to make a video smooth, each second of the video includes dozens or even hundreds of pictures, such as 24 pictures per second, 30 pictures per second, 50 pictures per second, 60 pictures per second, 120 pictures per second, etc. Therefore, there is very obvious temporal redundancy in the video. In other words, there are a lot of temporal correlations. "Motion" is often used in inter prediction so as to utilize the temporal correlations. A very simple "motion" model is as follows. An object is at a position on a picture corresponding to a moment, and after a certain period of time, the object translates to another position on the picture corresponding to a current moment, which is the most basic and commonly used translation motion in video coding. The "motion" is indicated by motion information in inter prediction. Basic motion information includes reference picture (such as reference frame) information and MV information. The codec determines a reference picture according to the reference picture information and determines coordinates of a reference block according to the MV information and coordinates of a current block. The reference block is determined according to the coordinates of the reference block in the reference picture. Motion in a video is not always simple. Even translation motion will have slight changes over time, such as slight deformation, brightness changes, noise changes, etc. Prediction may be performed on the current block by using more than one reference block, so as to achieve better prediction results. For example, in commonly used bidirectional prediction, prediction may be performed on the current block by using two reference blocks. The two reference blocks may be a forward reference block and a backward reference block, and may be two forward reference blocks or two backward reference blocks. The "forward" indicates that a time corresponding to the reference picture is before a current picture, and the "backward" indicates that the time corresponding to the reference picture is after the current picture. Alternatively, the "forward" indicates that a position of the reference picture in a video is before the current picture, and the "backward" indicates that the position of the reference picture in a video is after the current picture. Alternatively, the "forward" indicates that a picture order count (POC) of the reference picture is less than a POC of the current picture, and the "backward" indicates that the POC of the reference picture is greater than the POC of the current picture. Prediction with more reference blocks may be supported in future video coding standards. A simple way to generate a prediction block by using two reference blocks is to average sample values of corresponding positions of the two reference blocks to obtain the prediction block. In order to achieve a better prediction effect, weighted averaging may also be used, such as a bi-prediction with CU-level weight (BCW) currently used in VVC. A geometric partitioning mode (GPM) in VVC may also be understood as a special bidirectional prediction. In order to use the bidirectional prediction, two reference blocks are needed, and thus two sets of reference picture information and MV information are needed. Each set of reference picture information and MV information may be understood as one unidirectional motion information.

In addition to basic reference picture information and motion vector information, the motion information may also include some additional information, for example, whether a bi-prediction with CU-level weight (BCW), an index of BCW, or the like is used.

Reference Picture

The video is processed picture-by-picture without considering parallel processing. A coded picture can be stored in a buffer as a reference picture for a picture to be subsequently coded. Current coding standards have a set of reference picture management methods to manage reference pictures. The reference picture management method manages which pictures can be used as reference pictures for a current picture, along with indexes of these reference pictures, which pictures need to be stored in a buffer, and which pictures can be removed from the buffer since they are no longer used as reference pictures, etc.

According to different orders of picture encoding/decoding, current commonly used scenarios can be classified into two categories: random access (RA) and low delay (LD). In a LD scenario, a display order for pictures is the same as a encoding/decoding order for pictures, while in a RA scenario, the display order for pictures and the encoding/decoding order for pictures can be different. Generally speaking, in the LD scenario, encoding/decoding is performed picture-by-picture according to an original display order of a video. However, in a RA scenario, a display order of a video can be shuffled for picture encoding/decoding. To be specific, some pictures can be skipped from coding initially, while subsequent pictures are coded first, and then the skipped pictures are coded. One advantage of RA is that some pictures can refer to reference pictures before and after them, enabling better utilization of "motion" for improved compression efficiency.

Figure 2:
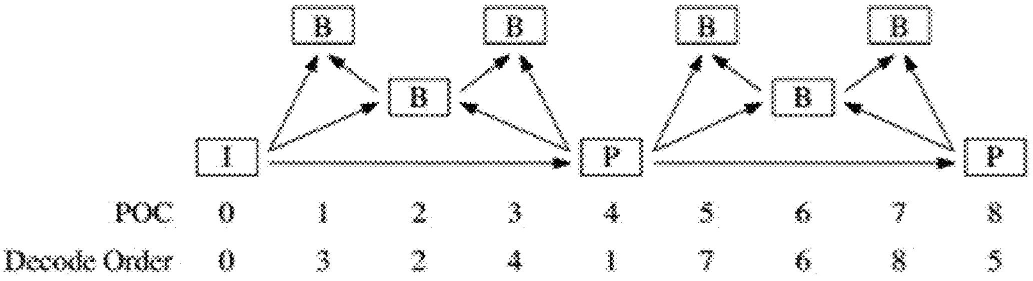
FIG. 2 is a schematic diagram illustrating a reference relationship between a current block and reference blocks in two directions.

The structure of a classic group of pictures (GOP) for RA is illustrated in FIG. 2. A predictive frame (P frame) in FIG. 2 is a frame on which only unidirectional (forward) prediction can be performed. A Bi-predictive frame (B frame) is a frame in which bidirectional prediction can be performed. The limitation of these reference relationships can also be applied to levels below picture level, such as P slice and B slice divided at slice level.

The arrows in FIG. 2 represent reference relationships. An I frame does not require a reference picture. After the I frame with POC 0 is coded, the P frame with POC 4 is coded with reference to the I frame with POC 0. Then, the B frame with POC 2 is coded with reference to the I frame with POC 0 and the P frame with POC, and so on.

The codec uses a reference picture list to manage reference pictures. VVC supports two reference picture lists, denoted as RPL0 and RPL1, where RPL is short for reference picture list. In VVC, P slice can only use RPL0, while B slice can use RPL0 and RPL1. For one slice, each reference picture list involves several reference pictures, and the codec finds a specific reference picture through a reference picture index. VVC uses a reference picture index and a motion vector to represent motion information. For example, VVC uses a reference picture index refIdxL0 corresponding to a reference picture list 0 and a motion vector mvL0 corresponding to the reference picture list 0, as well as a reference picture index refIdxL1 corresponding to a reference picture list 1 and a motion vector mvL1 corresponding to the reference picture list 1 to represent bidirectional motion information described above. The reference picture index corresponding to the reference picture list 0 and the reference picture index corresponding to the reference picture list 1 can be understood as the reference picture information described above. VVC uses two flags, predFlagL0 and predFlagL1, to indicate whether the motion information corresponding to the reference picture list 0 is used and whether the motion information corresponding to the reference picture list 1 is used, respectively. It can also be understood that predFlagL0 and predFlagL1 indicate whether the unidirectional motion information described above is valid.

The precision of motion vectors is not limited to integer pixels. VVC supports prediction with precisions of ½ pixel, ¼ pixel, ⅛ pixel, and 1/16 pixel. Prediction in fractional-pixels requires interpolation in integer pixels. This allows for finer motion vectors to improve prediction quality.

Motion Information Prediction

A reference block for a current block can be found from a reference picture by using motion information, and a prediction block for the current block is determined according to the reference block.

Motion information used for a current block can usually be predicted by using some related information, which can be referred to as motion information prediction or motion vector prediction. For example, motion information used for coded blocks surrounding and adjacent to a current block in a current picture can be used due to strong correlation between adjacent blocks. Also, motion information used for coded blocks surrounding but not adjacent to the current block in the current picture can be used because there is still some degree of correlation between blocks in a surrounding region and the current block, even if these blocks are not adjacent to the current block. This method for motion information prediction by using motion information used for coded blocks surrounding a current block is generally called spatial motion information prediction. In addition to coded blocks surrounding a current block, motion information of blocks related to a position of the current block in a coded picture can also be used for motion information prediction for current block, which is generally called temporal motion information prediction. Simply put, spatial motion information is derived using motion information from the same picture as the current block, while temporal motion information is derived using motion information in a different picture from the current block.

To utilize spatial motion information prediction, motion information of coded blocks in the current picture (or slice) needs to be saved. Generally, a minimum storage unit, for example, a 4×4 minimum storage unit is set. However, the minimum storage unit can also be 8×8 or of other sizes. Each time the codec codes a block, the codec stores motion information for all minimum storage units corresponding to the block. To find motion information of a block surrounding the current block, a minimum storage unit can be find according to the coordinates, and the motion information can be obtained. Similarly, for temporal motion information prediction, the motion information of a coded picture (or slice) needs to be saved. A minimum storage unit is also generally set, which can be of a size the same as or different from the size of the storage unit for spatial motion information, depending on the relevant standard rules. To find motion information of a block in the picture (or slice), a minimum storage unit can be find according to the coordinates, and the motion information can be obtained. It should be noted that due to the limitation in storage space or implementation complexity, only temporal motion information or spatial motion information in a certain coordinate range may be obtained for the current block.

One or more motion information can be obtained through motion information prediction. If more than one motion information is obtained, one or more motion information should be selected according to some established rules. For example, GPM in VVC uses two motion information, while sub-block based TMVP (SbTMVP) uses one motion information for each sub-block, where TMVP refers to temporal motion vector predictor.

To utilize predicted motion information, the predicted motion information can be directly adopted as motion information of the current block, as exemplified in merge in HEVC. Optionally, a motion vector difference (MVD) can be combined with the predicted motion information to obtain new motion information. From the perspective of design, it is desirable for predicted motion information to closely approximate the actual motion information, through motion information prediction cannot always be guaranteed to be accurate. Therefore, MVD can be used to obtain more accurate motion information. A new representation method of MVD is introduced in VVC. In the merge mode, this new MVD representation method can be combined with motion vector prediction, referred to as merge with MVD (MMVD). In short, motion information prediction can be used directly or in conjunction with other methods.

Candidate Motion Information List

Figure 3:
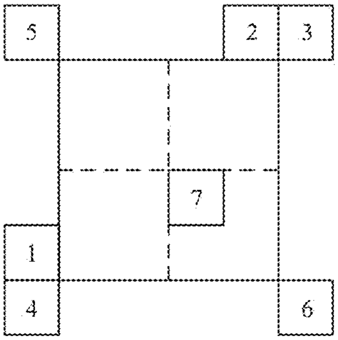
FIG. 3 is a schematic diagram of adjacent positions of a current block for deriving spatial motion information and temporal motion information.

A merge motion information candidate list is denoted as mergeCandList. When constructing mergeCandList, spatial motion information prediction based on positions 1 to 5 in FIG. 3 is first checked, and then temporal motion information prediction is checked. During checking temporal motion information prediction, if position 6 is available, the temporal motion information prediction is derived from position 6, which can also be referred to as derivation, i.e., the temporal motion information is calculated step by step based on position 6. Position 6 being available means that position 6 does not exceed the boundary of the picture or sub-picture and is in the same CTU row as the current block. For more details, reference can be made to the relevant standard document. If position 6 is unavailable, the temporal motion information prediction is derived from position 7. Position 6 can be represented by coordinates (xColBr, yColBr), and position 7 can be represented by coordinates (xColCtr, yColCtr).

Temporal Motion Information Derivation

Figure 4:
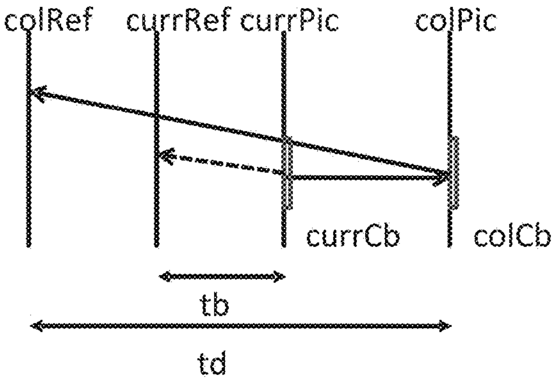
FIG. 4 is a schematic diagram illustrating calculation of a motion vector (MV) from a current block to a reference block according to an MV from a collocated block to a collocated reference block.

As illustrated in FIG. 4, currPic represents the current picture, currCb represents the current block, currRef represents the reference picture of the temporal motion information of the current block, colCb represents the collocated block, colPic represents the picture where the collocated block is located, and colRef represents the reference picture of the motion information used by the collocated block. During temporal motion information derivation, colCb is first found in colPic according to position information, and motion information of colCb is then identified. As illustrated in the FIG. 4, the motion information of colCb is a motion vector illustrated as a solid line from the colPic to the colRef. The motion vector illustrated as the solid line is scaled to a motion vector from currPic to currRef illustrated as a dashed line to obtain the temporal motion information. tb is a variable determined based on a difference between a POC of currPic and a POC of currRef, and td is a variable determined based on a difference between a POC of colPic and a POC of colRef. The motion vector is scaled according to tb and td. FIG. 4 illustrates unidirectional motion information, or a scaled motion vector. It can be understood that temporal motion information can utilize bidirectional motion information. Different temporal motion information may use different reference pictures. In other examples, the picture in which the collocated block is located and the reference picture of the temporal motion information of the current block may also be the same picture.

A specific example of temporal motion information derivation is illustrated as follows. Taking temporal motion information derivation based on position 6 in FIG. 3 as an example, the block at position 6 in the reference picture is denoted as Col, which is short for "collocated". This block is referred to as the collocated block, and the reference picture is referred to as the collocated picture. The following information is derived: an available flag availableFlagCol, a reference picture index refIdxLXCol, a reference picture list use flag predFlagLXCol, and a motion vector mvLXCol. The availableFlagCol indicates whether the temporal motion information of Col is available, and the reference picture index refIdxLXCol, the reference picture list use flag predFlagLXCol, and the motion vector mvLXCol together constitute the motion information, where X=0 . . . 1. Among the derived information, the motion vector mvLXCol can be determined based on the motion vector in the motion information of the collocated block, and other information can be obtained according to relevant rules.

The coordinates (xColBr, yColBr) of position 6 are calculated as (xCb+cbWidth, yCb+cbHeight). If the coordinates (xColBr, yColBr) meet the requirements, such as not exceeding the range of the current picture or sub-picture or not exceeding the range of the CTU row where the current block is located, the coordinates (xColBr, yColCb) of the collocated block is calculated as ((xColBr>>3)<<3, (yColBr>>3)<<3). The current block is denoted as currCb, the collocated block in the collocated picture ColPic is denoted as colCb, and colCb is a block covering (xColCb, yColCb). currPic represents the current picture. The reason for right-shifting (>>) by 3 bits and then left-shifting (<<) by 3 bits in calculating the coordinates is that the motion information in the collocated picture in this example is stored based on a 8×8 minimum storage unit (to save cache space, the granularity of caching reference picture motion information can be coarser). Right-shifting by 3 bits and then left-shifting by 3 bits changes the last 3 bits of the coordinates to 0. For example, 1010 is the binary representation of 10. After right-shifting by 3 bits and then left-shifting by 3 bits, it becomes 1000, which is the binary representation of 8.

For the convenience of description, some simplified assumptions are made here. In this example, it is assumed that motion information of a collocated block and temporal motion information to be derived only use one reference picture list LO. In this example, X that appears below is always set to 0. However, in some scenarios, the motion information of the collocated block and the temporal motion information to be derived are allowed to use two reference picture lists. Moreover, forward or backward motion information of temporal motion information derived according to forward or backward motion information of the collocated block can be combined in several manners. Here, only the simplest example is used for illustration. For simplicity, refIdxLX is also set to 0, and refIdxLX can have multiple possible values, which is not limited in the disclosure.

mvLXCol and availableFlagCol are derived as follows:
-If colCb is encoded in an intra, IBC, or palette mode, a horizontal component and a vertical component of mvLXCol are set to 0, and availableFlagCol is set to 0, in which case the collocated block is considered not available.
-Otherwise, availableFlagCol is set to 1. The motion vector mvCol, the reference picture index refIdxCol, and the reference picture list indicator listCol are derived as follows. mvCol, -continued refIdxCol, and listCol constitute the motion information of the collocated block for scaling.
mvCol, refIdxCol, and listCol are set to mvL0Col[xColCb][yColCb], refIdxL0Col[xColCb][yColCb], and L0, respectively.
predFlagLXCol is set to 1
mvLXCol is derived as follows:
-refPicList[listCol][refIdxCol] is the reference picture of the motion information of the collocated block colCb, i.e. colRef in the figure. RefPicList[X][refIdxLX] is the reference picture of the temporal motion information, i.e. currRef in the figure. The POC distance colPocDiff between ColPic and refPicList[listCol][refIdxCol] is calculated, and the POC distance currPocDiff between currPic and RefPicList[X][refIdxLX] is calculated.
colPocDiff = DiffPicOrderCnt (ColPic, refPicList [listCol] [refIdxCol])
currPocDiff = DiffPicOrderCnt (currPic, RefPicList [X] [refIdxLX])
If colPocDiff is equal to currPocDiff:
mvLXCol = Clip3 (−131072, 131071, mvCol)
Otherwise, mvLXCol is scaled according to mvCol:
tx = (16384 + (Abs (td) > > 1))/td
distScaleFactor = Clip3 (− 4096, 4095, (tb * tx + 32) > > 6)
mvLXCol = Clip3 (− 131072, 131071, (distScaleFactor * mvCol +; 128 − (distScaleFactor * mvCol >= 0)) > > 8)
Where:
td = Clip3 (− 128, 127, colPocDiff)
tb = Clip3 (− 128, 127, currPocDiff)

Noted that clip3 is a clipping function, and the values such as −131072, 131071, −4096, and 4095 in clip3 are related to data precision. These values can be different under different precision specifications. The above operations can be referred to in relevant standards.

Motion information of surrounding blocks of a current block can be utilized to predict motion information of the current block due to the correlation between the current block and the surrounding block. Temporal motion information prediction involves finding one block, i.e. collocated block in a collocated picture according to one position, and deriving motion information for a current block by using motion information of the collocated block. However, in an implementation process, it is not necessary to find a collocated block first to determine temporal motion information. Statistically, there is also a correlation between a current block and a collocated block, as even if the two blocks belong to different pictures, the time interval between the two pictures is not too long. Therefore, the current block and the collocated block may still belong to a same object if motion is not too intense. However, in some cases, the current block and the collocated block may not belong to the same object, or belong to different moving parts of the same object if, for example, the motion is relatively intense, the time interval between two pictures is relatively long, a difference between POCs of two pictures is relatively large, or the video has a low frame rate, etc. As a result, temporal motion information determined according to one position is not applicable to the current block in some cases.

When using temporal motion information prediction in a list, such as a mergeCandList, it is generally believed that motion information candidate with smaller index in the list has a higher probability of being selected, while motion information candidate with larger index has a lower probability of being selected. Therefore, variable-length coding is used for the list, with shorter codewords for smaller indexes and longer codewords for larger indexes. As a result, if an inapplicable motion information candidate is added to the list, not only the inapplicable motion information candidate itself will be wasted, this will also affect codeword lengths of candidates following the inapplicable motion information candidate. The codeword length affects the cost of indicating that index in the bitstream. If whether a temporal motion information is applicable to the current block can be determined in advance, it will be beneficial for improving compression efficiency.

Temporal motion information can be checked according to motion trajectory. That is to, assuming that motion represented by motion information used for a collocated block does not change significantly (the assumption is reasonable due to inertia and the small time delay between the current picture and the reference picture), whether an object on the collocated block can move to a position in the current block or a certain range around the current block can accurately reflect whether the temporal motion information is available.

The following is explained with examples in conjunction with accompanying drawings.

In FIGS. 5A-5C, FIGS. 6A-6C, and FIGS. 7A-7C, collocated reference pictures are reference pictures of motion information of collocated blocks described above. The collocated reference picture, the collocated picture, and the current picture are arranged in chronological order from left to right. The position of collocated block 13 is represented by a small black square. The moving object 11 is represented by a circle, and the double-line arrow above the circle indicates the direction of motion of the object 11. The position of current block 15 is represented by a large rectangular block. The motion vector is represented by the single arrow. In these figures, it is assumed that the position used for temporal motion information prediction of the current block 15 is at the bottom right of the current block, so the corresponding position of the collocated block 13 is also at the bottom right of the current block.

Figure 5A:
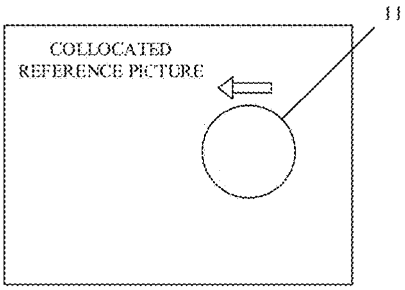
FIGS. 5A-5C are schematic diagrams illustrating relationship between a current block, a collocated block, and a motion vector as an object moves from right to left.
Figure 5B:
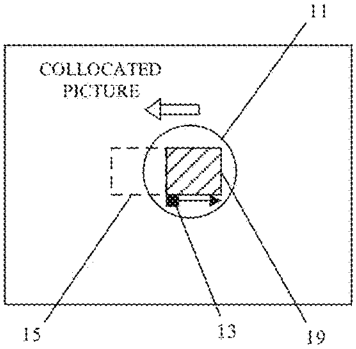
Figure 5C:
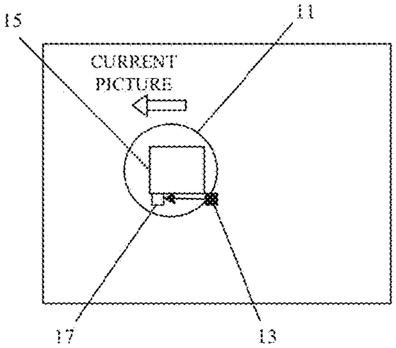

In FIGS. 5A-5C, the object 11 moves from right to left and just moves to the position of the current block 15 in the current picture. The single arrow in FIG. 5B represents the motion vector of the collocated block 13, which is opposite to the direction of motion of the object 11. The rectangular block 19 with section lines represents the position of the reference block 19 in the collocated picture determined according to the motion vector and the position of the current block 15 (represented by a dashed line block in the collocated picture). It can be seen that the reference block 19 is in the range of the object 11 in the collocated picture, and the current block is in the range of the object 11 in the current picture. The correlation between the reference block and the current block is high, so the temporal motion information derived based on the bottom right position is available.

Figures 6A, 6B, 6C:
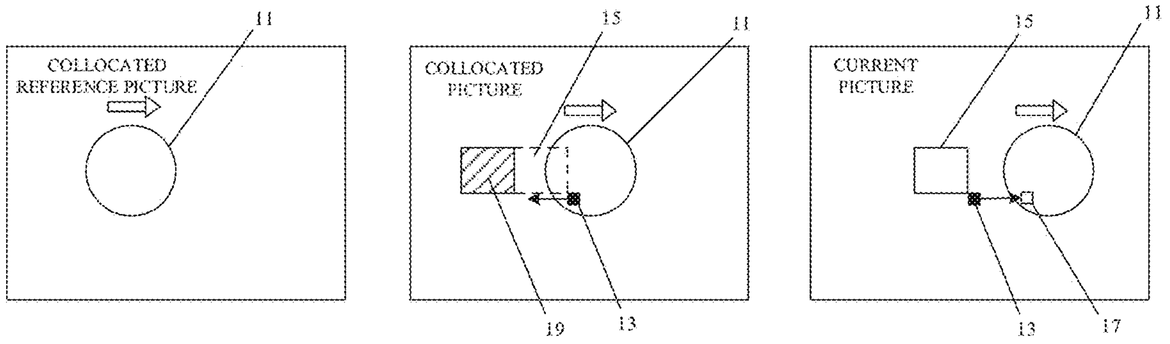
FIGS. 6A-6C are schematic diagrams illustrating relationship between a current block, a collocated block, and a motion vector as an object moves from left to right.

In FIGS. 6A-6C, the object 11 moves from left to right to a position far from the current block 15 and to the right of the current block 15 in the current picture. The single arrow in FIG. 6B represents the motion vector of the collocated block 13, which is opposite to the direction of motion of the object 11. The rectangular block with section lines represents the position of the reference block 19 determined according to the motion vector and the position of the current block 15 (represented by a dashed line block in the collocated picture). It can be seen that the reference block 19 is not in the range of the object 11 in the collocated picture, and the current block is not in the range of the object 11 in the current picture. The correlation is low, so the temporal motion information derived based on the bottom right position is unavailable.

Figures 7A, 7B, 7C:
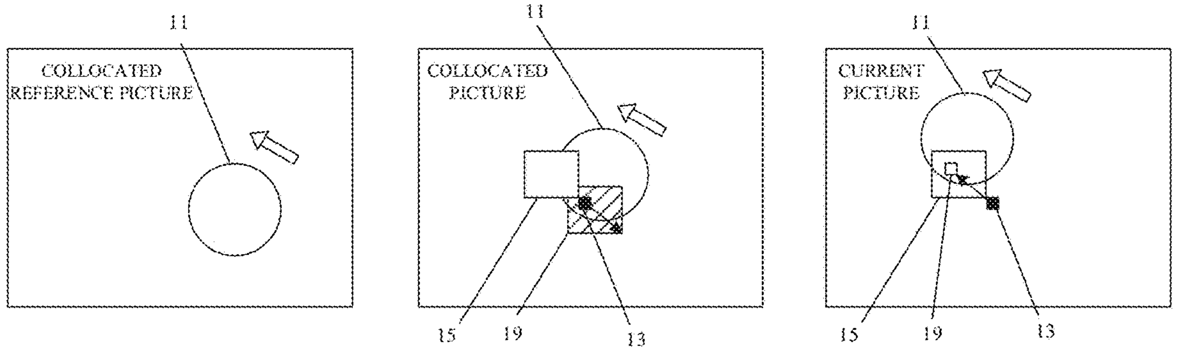
FIGS. 7A-7C are schematic diagrams illustrating relationship between a current block, a collocated block, and a motion vector as an object moves from bottom right to top left.

The example illustrated in FIGS. 7A-7C is similar to that in FIGS. 5A-5C, except that the motion direction of object 11 is from the bottom right to the top left. It can be seen that the correlation between the current block 15 and the reference block 19 is relatively high in this example, so the temporal motion information derived from the bottom right position is available.

Figure 8:
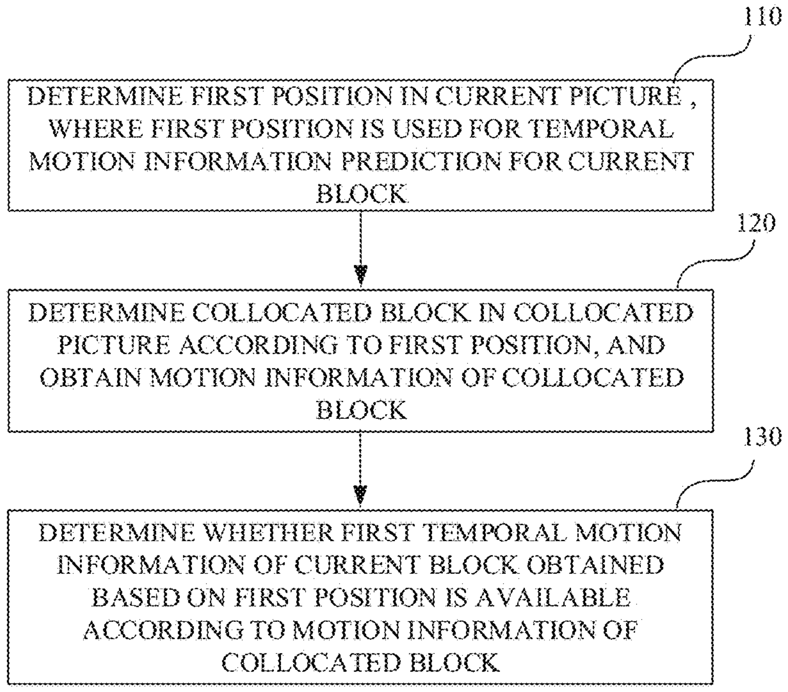
FIG. 8 is a flowchart of a method for temporal motion information prediction according to an embodiment of the present disclosure.

A method for temporal motion information prediction is provided in an embodiment of the present disclosure. As illustrated in FIG. 8, the method includes the following.

At S110, a first position in a current picture is determined, where the first position is used for temporal motion information prediction for a current block.

At S120, a collocated block in a collocated picture is determined according to the first position, and motion information of the collocated block is obtained.

At S130, whether first temporal motion information of the current block obtained based on the first position is available is determined according to the motion information of the collocated block.

Bidirectional temporal motion information prediction can be performed based on the first position, and two temporal motion information can be obtained. The reference pictures of the two temporal motion information can be different, and the final results of availability determination can also be different. The availability of the two temporal motion information can be determined using the above process. Moreover, at S130, it is not necessary to actually calculate the first temporal motion information when determining whether the first temporal motion information of the current block obtained based on the first position is available.

In an exemplary embodiment of the disclosure, the first position is an adjacent position of the current block, or the first position is a non-adjacent position of the current block.

In an exemplary embodiment of the disclosure, the first position is at the bottom right of the current block, or at the right of the current block, or at the bottom of the current block.

Figure 9:
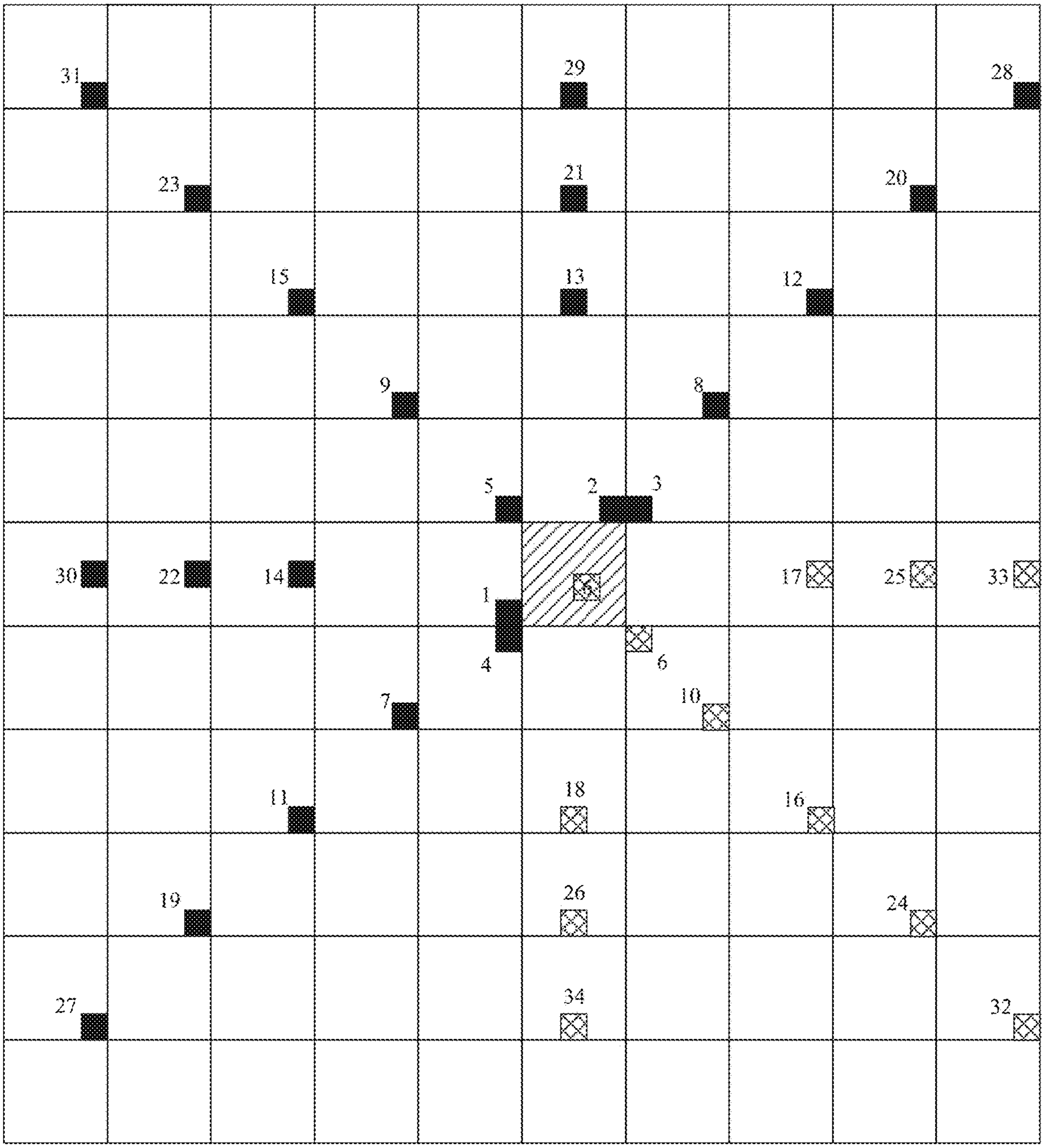
FIG. 9 is a schematic diagram of positions for temporal motion information prediction and spatial motion information prediction according to an embodiment of the present disclosure.

As illustrated in FIG. 9, the small black square represents a position for spatial motion information prediction, and the small square with section lines represents a position for temporal motion information prediction. Position 6 is an adjacent position of the current block. Positions with serial numbers greater than 6 are non-adjacent positions of the current block, including positions at the bottom right of the current block, positions at the right of the current block, and positions at the bottom of the current block. In other examples, positions for temporal motion information prediction may also be distributed in only one or two of these directions. Since the existing positions for spatial motion information prediction are distributed in other positions around the current block, setting the positions for temporal motion information prediction in these three directions helps compensate for the deficiency of spatial motion information prediction.

In an exemplary embodiment of the disclosure, the collocated picture is a reference picture of the first temporal motion information of the current block, and the collocated block is a minimum storage unit or coding unit in the collocated picture.

In an exemplary embodiment of the disclosure, in a picture sequence, a reference picture of the motion information of the collocated block is before the collocated picture, and the collocated picture is before the current picture. This order is consistent with positions of the respective pictures in FIGS. 5A-5C.

In an exemplary embodiment of the disclosure, whether the first temporal motion information of the current block obtained based on the first position is available being determined according to the motion information of the collocated block includes the following. A second motion vector is obtained by transforming a first motion vector in the motion information. A first region where the collocated block is located after being moved according to the second motion vector is determined. A second region is determined according to the current block, and the first temporal motion information being unavailable is determined when the second region does not intersect with the first region or a sub-region of the first region.

The sub-region here, for example, may be a partial region in the first region, such as a region in which one or more pixels are located.

In the embodiment, obtaining a second motion vector by transforming a first motion vector in the motion information includes the following. the second motion vector is obtained by scaling and reversing the first motion vector in the motion information according to a difference between a POC of the collocated picture and a POC of a reference picture of the motion information and a difference between the POC of the collocated picture and a POC of the current picture. Here, "reversing" a vector refers to changing the direction of the vector to the opposite of its original direction. In a two-dimensional plane, it is equivalent to flipping 180 degrees.

In the embodiment, the method for scaling the first motion vector in the motion information is the same as the method for scaling the first motion vector to obtain the motion vector in the first temporal motion information, except that a reversing operation needs to be performed here. The second motion vector obtained by transforming has the same magnitude as the motion vector in the first temporal motion information, but in the opposite direction. The second motion vector and the motion vector in the first temporal motion information can refer to FIGS. 5B and 5C. The single arrow in FIG. 5B represents the motion vector in the first temporal motion information, and the single arrow in FIG. 5C represents the second motion vector.

Referring to FIG. 5C, the first region where the collocated block is located after being moved according to the second motion vector is represented by the hollow small square in FIG. 5C. The first region is also referred to herein as a mapped block of the collocated block. The mapped block in FIG. 5C is adjacent to the current block. Similarly, in FIG. 7C, the mapped block enters the range of the current block.

In an exemplary embodiment of the disclosure, the second region includes a region where the current block is located. For example, the second region is a region where the current block is located, or the second region is a region covering the current block and the area of the second region is larger than the area of the current block. Extending the region of the current block can make it possible to determine that the first temporal motion information is available in the case of FIG. 5C, obtaining a reference block with a higher degree of correlation.

In an exemplary embodiment of the disclosure, the first position is at the bottom right of the current block, or at the right of the current block, or at the bottom of the current block, and the second region includes at least a top right region of a picture defined by a line of a right boundary of the current block and a line of a bottom boundary the current block.

In an example of the disclosure, the horizontal coordinate of the second region is less than or equal to the horizontal coordinate of the bottom right corner of the current block plus m, and the vertical coordinate of the second region is less than or equal to the vertical coordinate of the bottom right corner of the current block plus n, where m and n are set values, $m \geq 0$, $n \geq 0$. Here, m and n, as set values, can be predefined fixed values, values selected according to parameters, or values calculated according to relevant parameters. The specific value can be determined according to implementation. FIG. 9 illustrates the second region when m=0 and n=0, located at the top left region of the picture defined by two bold solid lines in the figure. If m is not 0, the right boundary of the second region moves to the right, and if n is not 0, the bottom boundary of the second region moves downward, making the second region larger. It is easy to understand that in this example, the relationship between coordinates of the second region and coordinates of the bottom right corner of the current block is related to the direction of the coordinate system. This example is based on a coordinate system where the horizontal coordinate increases from left to right and the vertical coordinate increases from top to bottom. If the direction of the horizontal and vertical axes of the coordinate system changes, the relationship between the above coordinates will also change.

In the embodiment, the range of the second region is divided according to the directional orientation of the first position. Therefore, whether objects moving towards the current block from the right, the bottom right, or the bottom are available can be determined more accurately, avoiding some larger objects from being determined as unavailable.

In an exemplary embodiment of the disclosure, the first temporal motion information being available is determined when the second region intersects with the first region or the sub-region of the first region.

In embodiments of the disclosure described above, availability determination for temporal motion information is performed, which can more accurately determine the correlation between the reference block determined according to the first temporal motion information and the current block, so as to reasonably choose whether to use the first temporal motion information.

An embodiment of the present disclosure provides a method for temporal motion information prediction. In this embodiment, a collocated block is used for prediction, and motion information is stored in blocks which can be understood as the minimum storage unit of motion information, such as blocks of 4×4, 8×8, and 16×16. All points in the minimum storage unit share the same motion information. However, the present disclosure is not limited to such a size of the collocated block. A certain point can also be used to determine the motion information, in which case the collocated block can be considered as a collocated point. This may be determined according to the application environment of the solution.

A process of temporal motion information prediction includes the following. A position for temporal motion information prediction is determined according to a current block. A collocated block in a collocated picture is determined according to the position. Motion information of the collocated block is determined according to the collocated block. First temporal motion information is determined according to the motion information of the collocated block. However, the process in embodiments of disclosure includes the following. A position for temporal motion information prediction is determined according to a current block. A collocated block in a collocated picture is determined according to the position. Motion information of the collocated block (i.e., the second motion vector in embodiments described above) is determined according to the collocated block. Whether the first temporal motion information is applicable to the current block is checked according to the motion information of the collocated block. If the first temporal motion information is applicable to the current block, first temporal motion information is determined according to the motion information of the collocated block, for example, the motion vector in the first temporal motion information is determined to be a vector in the opposite direction to the second motion vector. Otherwise, proceed to other processes, for example, the first temporal motion information is set as invalid, motion information part of the reference picture list that corresponds to the usage of the first temporal motion information is set as invalid, or predFlag corresponding to the first temporal motion information is set to 0.

Temporal motion information can also be bidirectional motion information, and the embodiment may be applied to derive one or two unidirectional motion information of the bidirectional motion information, to obtain one or two first temporal motion information.

In the embodiment, a method for checking whether temporal motion information is applicable to a current block according to motion information of a collocated block includes the following. A motion vector (or motion information) from the collocated picture to the current picture is determined according to the motion information of the collocated block, so as to determine motion information of the collocated. A region where the collocated block is located in the current picture after being moved according to the determined motion information is called a mapped block. If the mapped block intersects with the current block or an extended range of the current block, the first temporal motion information is applicable to the current block. Reference can be made to FIGS. 5C and 7C.

A method for determining a motion vector from a collocated picture to a current picture (i.e., second motion vector) according to motion information of a collocated block includes the following. The motion information of the collocated block can be understood as a motion vector from the collocated picture to a collocated reference picture (i.e., first motion vector). The motion vector from the collocated picture to the current picture can be derived using a method similar to the method for temporal motion information derivation, because the process of temporal motion information derivation can also be understood as deriving a motion vector from the current picture to the reference picture of temporal motion information of the current picture, i.e., currRef, according to the motion vector from the collocated picture to the collocated reference picture.

An example of data structure suitable for VVC is provided. The motion vector from the collocated picture to the current picture is denoted as mvLXExtend, where X may be 0 or 1. It is allowed to use bidirectional motion information, as VVC allows the use of two reference picture lists. The example here is to derive unidirectional information.

mvLXExtend, predFlagLXExtend are derived as follows:

```
    -The motion vector mvCol, the reference picture index
    refIdxCol, and the reference
    picture list indicator listCol are derived as follows.
    mvCol, refIdxCol, and listCol
    constitute the motion information of the collocated
    block for scaling. mvCol, refIdxCol,
    and listCol are set to mvL0Col[xColCb][yColCb],
    refIdxL0Col[xColCb][yColCb], and
    L0, respectively.
predFlagLXExtend is set to 1
mvLXExtend is derived as follows:
        -refPicList[listCol][refIdxCol] is the reference
        picture of the motion information
```

-continued

```
        of the collocated block colCb, i.e. colRef in
        the figure. RefPicList[X][refIdxLX]
        is the reference picture of the temporal motion
        information, i.e. currRef in the
        figure. The POC distance colPocDiff between ColPic and
        refPicList[listCol][refIdxCol] is calculated,
        and the POC distance extendPocDiff
        between colPic and currPiccolPic is calculated.
colPocDiff = DiffPicOrderCnt( ColPic,
refPicList[ listCol ][ refIdxCol ] )
extendPocDiff = DiffPicOrderCnt( ColPic, currPic )
      If colPocDiff is equal to −currPocDiff:
      mvLXExtend = −Clip3( −131072, 131071, mvCol )
      Otherwise, mvLXExtend is scaled according to mvCol:
      tx' = ( 16384 + ( Abs( td' ) >> 1 ) ) / td'
      distScaleFactor' = Clip3( −4096, 4095, (tb' * tx' + 32 ) >> 6 )
      mvLXExtend = Clip3( −131072, 131071,
      (distScaleFactor' * mvCol +128 −
      ( distScaleFactor' * mvCol >= 0 ) ) >> 8 )
      Where:
      td' = Clip3( −128, 127, colPocDiff )
      tb' = Clip3( −128, 127, extendPocDiff )
```

Here, clip3 is a clipping function, and the values such as −131072, 131071, −4096, and 4095 in clip3 are related to data precision. These values can be different under different precision specifications.

With mvLXExtend derived, a position of a mapped block can be determined according to a position of a collocated block. Coordinates of the top left corner of the collocated block are denoted as (xColCb, yColCb), and coordinates of the top left corner of the mapped block are denoted as (xMapCb, yMapCb). Then, xMapCb=xColCh+mvLXExtend [0], and yMapCb=yColCb+mvLXExtend [1]. With the position of the mapped block, whether the mapped block intersects with the current block or an extended range of the current block. mvLXExtend [0] and mvLXExtend [1] represent the horizontal and vertical components of mvLXExtend, respectively.

A range of the current block is a rectangular region with horizontal coordinate from xCb to xCb+cbWidth−1 and vertical coordinate from yCb to yCb+cbHeight−1. A method for determining whether a mapped block intersects with a current block is to determine if at least one of the four vertices of the mapped block is in the range of the current block.

Since motion may change at different times, such as change in speed or direction, etc., an extended range of the current block can be used for determination. This allows for a certain degree of variation in the temporal motion information. For example, by extending the current block up, down, left, and right by m pixels respectively, the extended range of the current block would have horizontal coordinates from xCb−m to xCb+cbWidth+m and vertical coordinates from yCb−m to yCb+cbHeight+m. Of course, all ranges above can be subject to a limiting condition that they do not exceed the range of the current picture.

For simplicity, instead of directly determining whether the mapped block intersects with the current block or an extended range of the current block, whether a point in the mapped block is in the current block or an extended range of the current block is determined. For example, whether a point at the top left of the mapped block or a point at the center of the mapped block is in the current block or an extended range of the current block is determined. Optionally, if the coordinates used to derive the temporal motion information are (xTemp, yTemp), whether (xTemp+mvLXExtend [0], yTemp+mvLXExtend [1]) is within the current block or an extended range of the current block can be determined. In a possible scenario, (xTemp, yTemp) can be (xColBr, yColBr).

Figure 10:
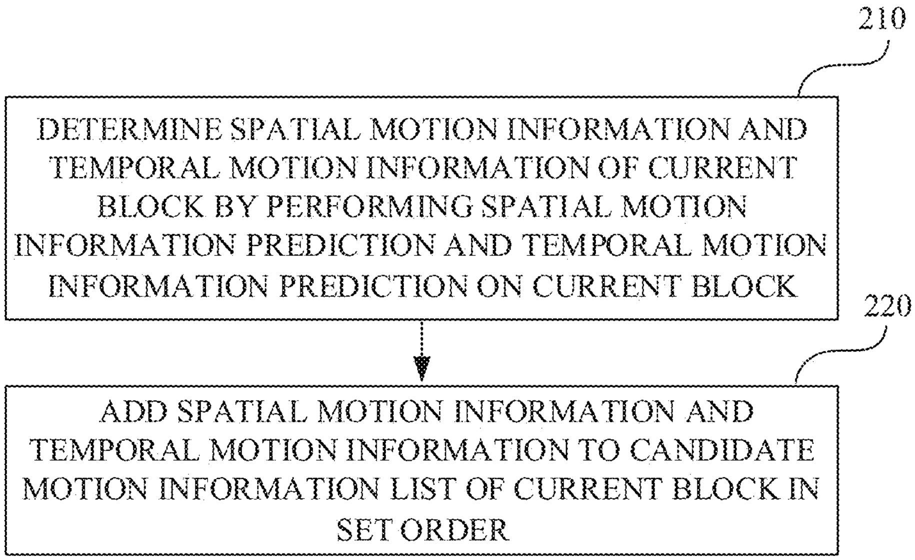
FIG. 10 is a flowchart of a method for candidate motion information list constructing according to an embodiment of the present disclosure.

A method for candidate motion information list constructing is further provided in an embodiment of the present disclosure. As illustrated in FIG. 10, the method includes the following.

At S210, spatial motion information and temporal motion information of a current block are determined in performing spatial motion information prediction and temporal motion information prediction on the current block.

At S220, the spatial motion information and the temporal motion information are added to a candidate motion information list of the current block in a set order.

Whether the first temporal motion information is available is determined in the temporal motion information prediction according to the method of any embodiment of the present disclosure, and the first temporal motion information is not added to the candidate motion information list when the first temporal motion information is unavailable.

In embodiments of the disclosure described above, availability determination for temporal motion information is performed. The first temporal motion information may not be added to the candidate motion information list when the first temporal motion information is unavailable. Therefore, more effective motion information can be added to the candidate motion information list, thereby improving the effect of motion information prediction. The index of the motion information selected from the candidate motion information list is enabled to be smaller, so as to save resource for index encoding.

Figure 11:
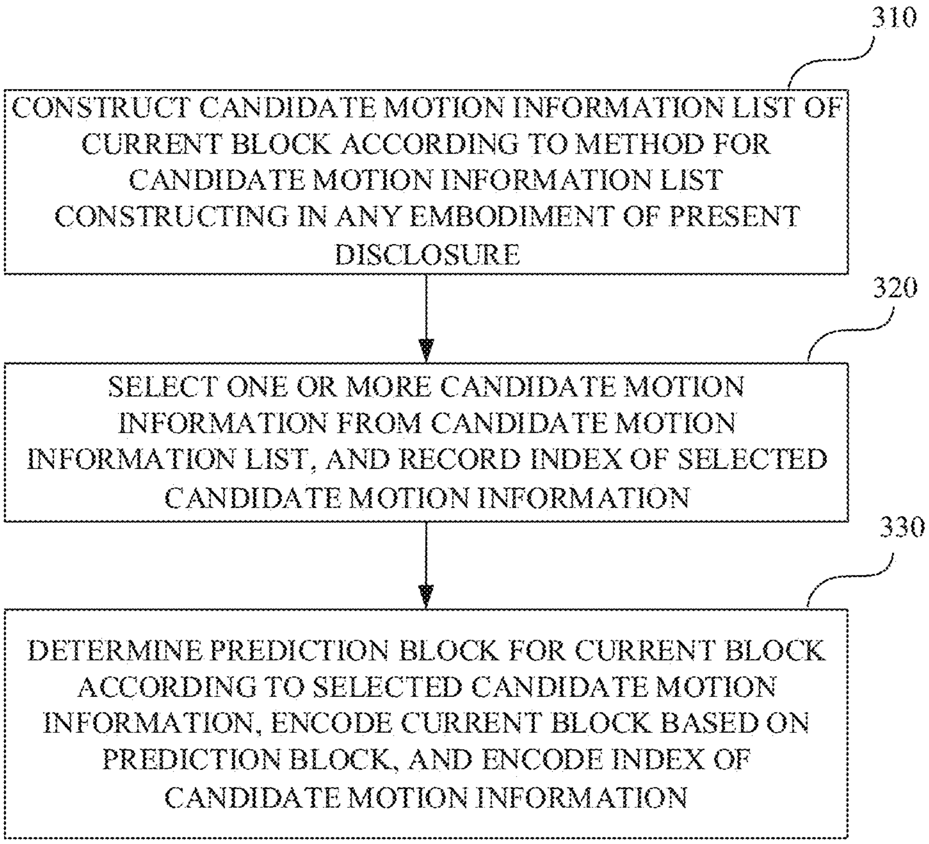
FIG. 11 is a flowchart of a method for video encoding according to an embodiment of the present disclosure.

A method for video encoding is further provided in an embodiment of the present disclosure. As illustrated in FIG. 11, the method includes the following.

At S310, a candidate motion information list of a current block is constructed according to the method for candidate motion information list constructing in any embodiment of the present disclosure.

At S320, one or more candidate motion information is selected from the candidate motion information list, and an index of the selected candidate motion information is recorded.

At S330, a prediction block for the current block is determined according to the selected candidate motion information, the current block is encoded based on the prediction block, and the index of the candidate motion information is encoded.

A position of a reference block for the current block in a reference picture can be determined according to the selected candidate motion information. In this case, the reference block can be obtained through adding an MVD to the selected candidate motion information, and the prediction block can be obtained based on the reference block (such as one or two). Subsequently, a residual between the prediction block and the current block can be calculated and encoded.

In embodiments of the present disclosure, the temporal motion information that is obviously not applicable to the current block can be filtered out by adding a determination on whether the temporal motion information is applicable to the current block, thereby improving compression efficiency. Specifically, by determining the availability of the temporal motion information, the first temporal motion information is not added to the candidate motion information list when the first temporal motion information is unavailable. Therefore, more effective motion information can be added to the candidate motion information list, thereby improving the effect of motion information prediction. The index of the motion information selected from the candidate motion information list is enabled to be smaller, so as to improve compression efficiency.

Figure 12:
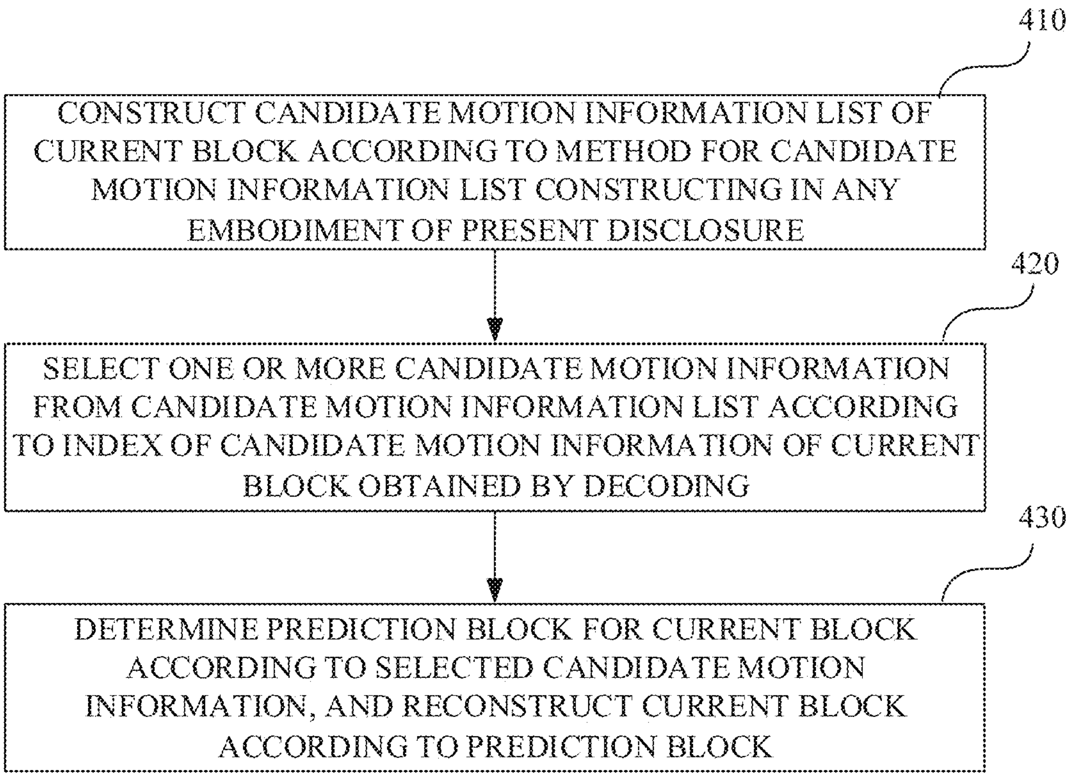
FIG. 12 is a flowchart of a method for video decoding according to an embodiment of the present disclosure.

A method for video decoding is further provided in an embodiment of the present disclosure. As illustrated in FIG. 12, the method includes the following.

At S410, a candidate motion information list of a current block is constructed according to the method for candidate motion information list constructing in any embodiment of the present disclosure.

At S420, one or more candidate motion information is selected from the candidate motion information list according to an index of candidate motion information of the current block obtained through decoding.

At S430, a prediction block for the current block is determined according to the selected candidate motion information, and the current block is reconstructed according to the prediction block.

Figure 13:
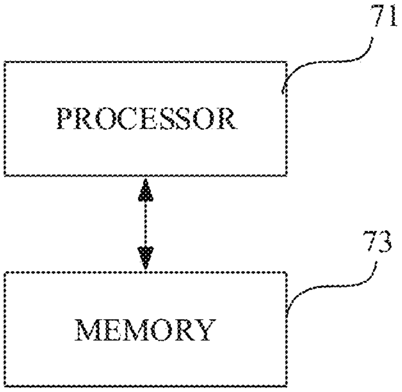
FIG. 13 is a schematic diagram of an apparatus for temporal motion information prediction according to an embodiment of the present disclosure.

An apparatus for temporal motion information prediction is further provided in an embodiment of the present disclosure. As illustrated in FIG. 13, the apparatus for temporal motion information prediction includes a memory 73 configured to store a computer program and a processor 71 configured to execute the computer program to perform the method for temporal motion information prediction in any embodiment of the present disclosure.

An apparatus for candidate motion information list constructing is further provided in an embodiment of the present disclosure. As illustrated in FIG. 13, the apparatus for candidate motion information list constructing includes a memory configured to store a computer program and a processor configured to execute the computer program to perform the method for candidate motion information list constructing in any embodiment of the present disclosure.

An apparatus for video encoding is further provided in an embodiment of the present disclosure. As illustrated in FIG. 13, the apparatus for video encoding includes a memory configured to store a computer program and a processor configured to execute the computer program to perform the method for video encoding in any embodiment of the present disclosure.

An apparatus for video decoding is further provided in an embodiment of the present disclosure. As illustrated in FIG. 13, the apparatus for video decoding includes a memory configured to store a computer program and a processor configured to execute the computer program to perform the method for video decoding in any embodiment of the present disclosure.

A system for video coding is further provided in an embodiment of the present disclosure. The system for video coding includes the apparatus for video encoding in any embodiment of the present disclosure and the apparatus for video decoding in any embodiment of the present disclosure.

A non-transitory computer-readable storage medium is further provided in an embodiment of the present disclosure. The non-transitory computer-readable storage medium is configured to store a computer program which, when executed by a processor, causes the processor to perform the method in any embodiment of the present disclosure.

A bitstream is further provided in an embodiment of the present disclosure. The bitstream is generated according to the method for video encoding in any embodiment of the present disclosure.

The apparatus for video encoding and/or the apparatus for video decoding in the foregoing embodiments of the disclosure may be implemented by any one of the following circuits or any combination of the following circuits: one or more microprocessors, digital signal processors (DSPs), application specific integrated circuits (ASICs), field programmable gate arrays (FPGAs), discrete logic, and hardware. If the disclosure is implemented partially by software, instructions for the software may be stored in a suitable non-transitory computer-readable storage medium, and may be executed by hardware of one or more processors to implement the methods of embodiments of the disclosure.

In one or more exemplary embodiments, the functions described may be implemented by hardware, software, firmware, or any combination thereof. If implemented by software, the functions may be stored in or transmitted over a computer-readable medium as one or more instructions or codes and executed by a hardware-based processing unit. The computer-readable medium may include a computer-readable storage medium corresponding to a tangible medium such as a data storage medium, or a communication medium including any medium for transmitting computer programs from one place to another, for example, based on a communication protocol. In this manner, the computer-readable medium may usually correspond to a non-transitory tangible computer-readable storage medium or a communication medium such as a signal or a carrier. The data storage medium may be any available medium that can be accessed by one or more computers or one or more processors to retrieve instructions, codes, and/or data structures for implementation of the technology described in the disclosure. A computer program product may include a computer-readable medium.

By way of example rather than limitation, such computer-readable storage medium may include a random access memory (RAM), a read-only memory (ROM), an electrically erasable programmable ROM (EEPROM), a compact disc ROM (CD-ROM) or other optical disc storage devices, magnetic disc storage devices or other magnetic storage devices, flash memory, or any other medium that can be used to store desired program codes in the form of instructions or data structures and can be accessed by a computer. In addition, any connection may be termed a computer-readable medium. For example, if instructions are transmitted from a website, server, or other remote sources by using a coaxial cable, an optical fiber cable, a twisted pair, a digital subscriber line (DSL), or a wireless technology such as infrared, radio, and microwave, the coaxial cable, the optical fiber cable, the twisted pair, the DSL, or the wireless technology such as infrared, radio, and microwave are included in the definition of a medium. However, it may be appreciated, that the computer-readable storage medium and the data storage medium do not include a connection, a carrier, a signal, or other transitory media, but are intended for a non-transitory tangible storage medium. The magnetic disc and the optical disc used herein include a CD, a laser disc, an optical disc, a digital versatile disc (DVD), a floppy disc or a Blu-Ray disc, etc. where the magnetic disc usually reproduces data magnetically, while the optical disc reproduces data optically with lasers. Combinations of the above shall also be included within the scope of the computer-readable medium.

Instructions may be executed by one or more processors, such as one or more DSPs, general-purpose microprocessors, ASICs, FPGAs, or other equivalent integrated or discrete logic circuits. Thus, the term "processor" used herein may refer to any of the foregoing structure or any other structure suitable for implementation of the technology described herein. In addition, in some aspects, the functionality described herein may be provided within dedicated hardware and/or software modules configured for coding, or incorporated in an integrated encoder-decoder. In addition, the technology may be embodied completely in one or more circuits or logic elements.

The technical solutions of embodiments of the disclosure can be implemented in a wide variety of apparatuses or devices, including a wireless mobile phone, an integrated circuit (IC), or a group of ICs (e.g., a chipset). Various components, modules, or units are described in embodiments of the disclosure are configured to implement functions of devices based on the described technology, but do not necessarily mean that these functions shall be implemented by different hardware units respectively. Instead, as described above, various units may be combined in a hardware unit of an encoder-decoder or implemented by a collection of interoperative hardware units (including one or more processors described above) in conjunction with suitable software and/or firmware.

What is claimed is:

1. A method for video encoding, comprising:

determining spatial motion information and temporal motion information of a current block by performing spatial motion information prediction and temporal motion information prediction on the current block;

adding the spatial motion information and the temporal motion information to a candidate motion information list of the current block in a set order; wherein whether first temporal motion information is available is determined in the temporal motion information prediction by:

determining a first position in a current picture, wherein the first position is used for the temporal motion information prediction for the current block;

determining, according to the first position, a collocated block in a collocated picture, and obtaining motion information of the collocated block; and determining, according to the motion information of the collocated block, whether the first temporal motion information of the current block obtained based on the first position is available, comprising:

obtaining a second motion vector by transforming a first motion vector in the motion information;

determining a first region where the collocated block is located after being moved according to the second motion vector;

determining a second region according to the current block, and determining that the first temporal motion information is available when the second region intersects with the first region or a sub-region of the first region, and the first temporal motion information is not added to the candidate motion information list when the first temporal motion information is unavailable;

selecting one or more candidate motion information from the candidate motion information list, and recording an index of the selected candidate motion information; and determining a prediction block for the current block according to the selected candidate motion information, encoding the current block based on the prediction block, and encoding the index of the candidate motion information.

2. A method for video decoding, comprising:

determining spatial motion information and temporal motion information of a current block by performing spatial motion information prediction and temporal motion information prediction on the current block;

adding the spatial motion information and the temporal motion information to a candidate motion information list of the current block in a set order; wherein whether first temporal motion information is available is determined in the temporal motion information prediction by:

determining a first position in a current picture, wherein the first position is used for the temporal motion information prediction for the current block;

determining, according to the first position, a collocated block in a collocated picture, and obtaining motion information of the collocated block; and determining, according to the motion information of the collocated block, whether the first temporal motion information of the current block obtained based on the first position is available, comprising:

obtaining a second motion vector by transforming a first motion vector in the motion information;

determining a first region where the collocated block is located after being moved according to the second motion vector;

determining a second region according to the current block, and determining that the first temporal motion information is available when the second region intersects with the first region or a sub-region of the first region, and the first temporal motion information is not added to the candidate motion information list when the first temporal motion information is unavailable;

selecting one or more candidate motion information from the candidate motion information list according to an index of the candidate motion information of the current block obtained by decoding; and determining a prediction block for the current block according to the selected candidate motion information, and reconstructing the current block according to the prediction block.

3. The method of claim 2, wherein the first position is an adjacent position of the current block, or the first position is a non-adjacent position of the current block.

4. The method of claim 2, wherein the first position is at a bottom right of the current block, or at the right of the current block, or at a bottom of the current block.

5. The method of claim 2, wherein the collocated picture is a reference picture of the first temporal motion information of the current block, and the collocated block is a minimum storage unit or coding unit in the collocated picture.

6. The method of claim 2, wherein in a picture sequence, a reference picture of the motion information of the collocated block is before the collocated picture, and the collocated picture is before the current picture.

7. The method of claim 2, wherein determining, according to the motion information of the collocated block, whether the first temporal motion information of the current block obtained based on the first position is available comprises:

determining that the first temporal motion information is unavailable when the second region does not intersect with the first region or the sub-region of the first region.

8. The method of claim 7, wherein obtaining the second motion vector by transforming the first motion vector in the motion information comprises:

obtaining the second motion vector by scaling and reversing the first motion vector in the motion information according to a difference between a picture order count (POC) of the collocated picture and a POC of a reference picture of the motion information and a difference between the POC of the collocated picture and a POC of the current picture.

9. The method of claim 7, wherein the second region comprises a region where the current block is located.

10. The method of claim 7, wherein the first position is at a bottom right of the current block, or at the right of the current block, or at a bottom of the current block, and the second region comprises at least a top right region of a picture defined by a line of a right boundary of the current block and a line of a bottom boundary of the current block.

11. An apparatus for video decoding, comprising:

a memory configured to store a computer program; and a processor configured to execute the computer program to:

determine spatial motion information and temporal motion information of a current block by performing spatial motion information prediction and temporal motion information prediction on the current block;

add the spatial motion information and the temporal motion information to a candidate motion information list of the current block in a set order; wherein whether first temporal motion information is available is determined in the temporal motion information prediction by:

determining a first position in a current picture, wherein the first position is used for the temporal motion information prediction for the current block;

determining, according to the first position, a collocated block in a collocated picture, and obtaining motion information of the collocated block; and determining, according to the motion information of the collocated block, whether the first temporal motion information of the current block obtained based on the first position is available, comprising:

obtaining a second motion vector by transforming a first motion vector in the motion information;

determining a first region where the collocated block is located after being moved according to the second motion vector;

determining a second region according to the current block, and determining that the first temporal motion information is available when the second region intersects with the first region or a sub-region of the first region, and the first temporal motion information is not added to the candidate motion information list when the first temporal motion information is unavailable;

select one or more candidate motion information from the candidate motion information list according to an index of the candidate motion information of the current block obtained by decoding; and determine a prediction block for the current block according to the selected candidate motion information, and reconstruct the current block according to the prediction block.

12. The apparatus of claim 11, wherein the first position is an adjacent position of the current block, or the first position is a non-adjacent position of the current block.

13. The apparatus of claim 11, wherein the first position is at a bottom right of the current block, or at the right of the current block, or at a bottom of the current block.

14. The apparatus of claim 11, wherein the collocated picture is a reference picture of the first temporal motion information of the current block, and the collocated block is a minimum storage unit or coding unit in the collocated picture.

15. The apparatus of claim 11, wherein in a picture sequence, a reference picture of the motion information of the collocated block is before the collocated picture, and the collocated picture is before the current picture.

16. The apparatus of claim 11, wherein determining, according to the motion information of the collocated block, whether the first temporal motion information of the current block obtained based on the first position is available comprises:

determining that the first temporal motion information is unavailable when the second region does not intersect with the first region or the sub-region of the first region.

17. The apparatus of claim 16, wherein obtaining the second motion vector by transforming the first motion vector in the motion information comprises:

obtaining the second motion vector by scaling and reversing the first motion vector in the motion information according to a difference between a picture order count (POC) of the collocated picture and a POC of a reference picture of the motion information and a difference between the POC of the collocated picture and a POC of the current picture.

18. The apparatus of claim 16, wherein the second region comprises a region where the current block is located.

19. The apparatus of claim 16, wherein the first position is at a bottom right of the current block, or at the right of the current block, or at a bottom of the current block, and the second region comprises at least a top right region of a picture defined by a line of a right boundary of the current block and a line of a bottom boundary of the current block.

20. A non-transitory computer-readable storage medium storing a computer program and a bitstream, wherein the computer program, when executed by a processor, causes the processor to perform the method of claim 1 to generate the bitstream.

* * * * *